United States Patent
Hwang et al.

(10) Patent No.: US 10,952,057 B2
(45) Date of Patent: Mar. 16, 2021

(54) METHOD FOR ESTABLISHING EXTENDED NARROWBAND IN NARROWBAND WIRELESS COMMUNICATION SYSTEM, AND APPARATUS THEREFOR

(71) Applicant: LG ELECTRONICS INC., Seoul (KR)

(72) Inventors: Daesung Hwang, Seoul (KR); Joonkui Ahn, Seoul (KR); Seungmin Lee, Seoul (KR); Yunjung Yi, Seoul (KR); Hyangsun You, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/323,680

(22) PCT Filed: Jul. 31, 2017

(86) PCT No.: PCT/KR2017/008246
§ 371 (c)(1),
(2) Date: Feb. 6, 2019

(87) PCT Pub. No.: WO2018/030693
PCT Pub. Date: May 15, 2018

(65) Prior Publication Data
US 2019/0174285 A1 Jun. 6, 2019

Related U.S. Application Data

(60) Provisional application No. 62/371,833, filed on Aug. 7, 2016, provisional application No. 62/398,493, filed
(Continued)

(51) Int. Cl.
*H04W 4/80* (2018.01)
*H04W 72/04* (2009.01)
(Continued)

(52) U.S. Cl.
CPC ............... *H04W 4/80* (2018.02); *H04L 5/00* (2013.01); *H04W 4/70* (2018.02); *H04W 72/042* (2013.01); *H04W 72/0446* (2013.01)

(58) Field of Classification Search
CPC ......... H04W 4/70; H04W 4/80; H04W 72/02; H04W 72/04; H04W 72/042;
(Continued)

(56) References Cited

U.S. PATENT DOCUMENTS

| 2013/0083753 A1 | 4/2013 | Lee et al. |
| 2013/0195041 A1* | 8/2013 | Papasakellariou .. H04W 72/042 370/329 |

(Continued)

FOREIGN PATENT DOCUMENTS

| CN | 102450077 | 5/2012 |
| CN | 102907014 | 1/2013 |
| CN | 105580421 | 5/2016 |

OTHER PUBLICATIONS

PCT International Application No. PCT/KR2017/008246, Written Opinion of the International Searching Authority dated Nov. 6, 2017, 25 pages.

(Continued)

*Primary Examiner* — Candal Elpenord
(74) *Attorney, Agent, or Firm* — Lee, Hong, Degerman, Kang & Waimey (57) ABSTRACT

Disclosed is a method for a terminal to transmit an uplink data signal in a narrowband wireless communication system. Specifically, the method comprises the steps of: receiving, from a base station, a downlink control signal including resource allocation information for resource blocks continuously allocated for the uplink data signal within allocable resource blocks; and transmitting the uplink data signal to the base station using the downlink control signal, wherein the continuously allocated resource blocks are updated to
(Continued)

include a center block, when the allocable resource blocks include the center resource block of a system bandwidth.

6 Claims, 8 Drawing Sheets

Related U.S. Application Data on Sep. 22, 2016, provisional application No. 62/400,615, filed on Sep. 27, 2016, provisional application No. 62/417,258, filed on Nov. 3, 2016.

(51) Int. Cl.
*H04W 4/70* (2018.01)
*H04L 5/00* (2006.01)

(58) Field of Classification Search
CPC .... H04W 72/0446; H04L 5/00; H04L 5/0039; H04L 5/0094; H04L 5/0007; H04L 5/0064
See application file for complete search history.

(56) References Cited

U.S. PATENT DOCUMENTS

| | | | |
|---|---|---|---|
| 2013/0242947 A1 | 9/2013 | Chen et al. | |
| 2015/0009939 A1* | 1/2015 | Zhang | H04W 72/1289 370/329 |
| 2015/0036651 A1* | 2/2015 | Takeda | H04W 72/042 370/330 |
| 2015/0055570 A1* | 2/2015 | Viorel | H04W 72/04 370/329 |
| 2015/0237649 A1* | 8/2015 | Zhang | H04W 4/70 370/329 |
| 2016/0072614 A1 | 3/2016 | Blankenship et al. | |
| 2016/0073381 A1* | 3/2016 | Ratasuk | H04W 4/70 370/329 |
| 2017/0223725 A1* | 8/2017 | Xiong | H04L 5/0053 |
| 2017/0366311 A1* | 12/2017 | Iyer | H04L 5/0007 |
| 2018/0069672 A1* | 3/2018 | Horiuchi | H04W 72/0446 |
| 2018/0070332 A1* | 3/2018 | Chen | H04W 68/02 |
| 2018/0242320 A1* | 8/2018 | Wong | H04L 1/08 |

OTHER PUBLICATIONS

ZTE, "PRB group definition and frequency hopping for MTC enhancement", 3GPP TSG RAN WG1 Meeting #81, R1-152954, May 2015, 6 pages.

Mediatek, "Few issues on NB-PDSCH subframes", 3GPP TSG RAN WG1 NB-IoT Ad-Hoc Meeting, R1-161947, Mar. 2016, 2 pages.

Sharp, "On non-anchor PRBs for NB-IoT multi-carrier operation", 3GPP TSG RAN WG1 Meeting #84bis, R1-162835, Apr. 2016, 5 pages.

Nokia, et al., "Non-anchor PRB location for NB-IoT multi-carrier operation", 3GPP TSG RAN WG1 Meeting #85, R1-165002, May 2016, 2 pages.

Japan Patent Office Application No. 2019-506645, Office Action dated Jan. 28, 2020, 7 pages.

European Patent Office Application Serial No. 17839711.3, Search Report dated Jan. 17, 2020, 9 pages.

ETSI: "LTE; Evolved Universal Terrestrial Radio Access (E-UTRA); Physical layer procedures (3GPP TS 36.213 version 14.3.0 Release 14)," Aug. 2017, 462 pages.

INTEL, "Frequency domain resource allocation for feMTC", 3GPP TSG RAN WG1 Meeting #88, R1-1702149, Feb. 2017, 5 pages.

* cited by examiner

(A) CONTROL-PLANE PROTOCOL STACK (B) USER-PLANE PROTOCOL STACK

METHOD FOR ESTABLISHING EXTENDED NARROWBAND IN NARROWBAND WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2017/008246, filed on Jul. 31, 2017, which claims the benefit of U.S. Provisional Application No. 62/371,833, filed on Aug. 7, 2016, 62/398,493, filed on Sep. 22, 2016, 62/400,615, filed on Sep. 27, 2016, and 62/417,258, filed on Nov. 3, 2016, the contents of which are all hereby incorporated by reference herein in their entireties.

TECHNICAL FIELD

The present invention relates to a narrowband communication in a wireless communication system, and more particularly, to a method of establishing an extended narrowband in a narrowband wireless communication system and an apparatus therefor.

BACKGROUND ART

3GPP LTE (3rd generation partnership project long term evolution hereinafter abbreviated LTE) communication system is schematically explained as an example of a wireless communication system to which the present invention is applicable.

Figure 1:
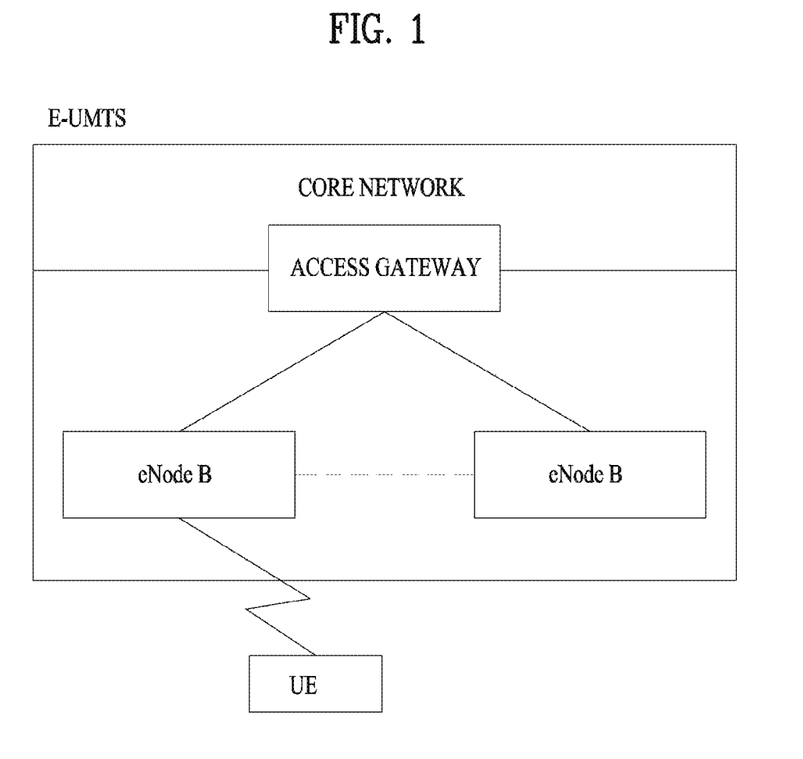
FIG. 1 illustrates a configuration of an Evolved Universal Mobile Telecommunications System (E-UMTS) network as an example of a wireless communication system.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B includes at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Based on the aforementioned discussion, the present invention proposes a method of establishing an extended narrowband in a narrowband wireless communication system and an apparatus therefor.

Technical Solution

To achieve these and other advantages and in accordance with the purpose of the present invention, as embodied and broadly described, according to one embodiment, a method of transmitting an uplink data signal, which is transmitted by a user equipment (UE) in a narrowband wireless communication system, includes the steps of receiving, from a base station, a downlink control signal including resource allocation information about resource blocks contiguously allocated for the uplink data signal among allocable resource blocks, and transmitting the uplink data signal to the base station using the downlink control signal. In this case, when the allocable resource blocks include a center resource block of a system bandwidth, the contiguously allocated resource blocks can be updated to include the center resource block.

To further achieve these and other advantages and in accordance with the purpose of the present invention, according to a different embodiment, a user equipment in a narrowband wireless communication system includes a wireless communication module and a processor configured to receive, from a base station, a downlink control signal including resource allocation information about resource blocks contiguously allocated for an uplink data signal among allocable resource blocks in a manner of being connected with the wireless communication module, the processor configured to transmit the uplink data signal to the base station using the downlink control signal. In this case, when the allocable resource blocks include a center resource block of a system bandwidth, the contiguously allocated resource blocks can be updated to include the center resource block.

In the embodiment above, a size of the resource allocation information has a fixed value irrespective of whether or not the allocable resource blocks include the center resource block.

Preferably, the resource allocation information indicates the contiguously allocated resource blocks except the center resource block and when the allocable resource blocks include the center resource block, the contiguously allocated resource blocks indicated by the resource allocation information can be updated to include the center resource block.

More preferably, when the allocable resource blocks include the center resource block of the system bandwidth, the contiguously allocated resource blocks indicated by the resource allocation information can be updated to exclude a resource block of the last index.

Additionally, the resource allocation information can include a starting index of the contiguously allocated resource blocks and information on the number of the contiguously allocated resource blocks.

Advantageous Effects

According to embodiments of the present invention, it is able to smoothly perform communication by efficiently establishing an extended narrowband in addition to a legacy narrowband in a narrowband wireless communication system.

It will be appreciated by persons skilled in the art that that the effects that can be achieved through the present invention are not limited to what has been particularly described hereinabove and other advantages of the present invention will be more clearly understood from the following detailed description.

BEST MODE

Mode for Invention

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. The term 'Base Station (BS)' may be used to cover the meanings of terms including Remote Radio Head (RRH), evolved Node B (eNB or eNode B), Reception Point (RP), relay, etc.

Figure 2:
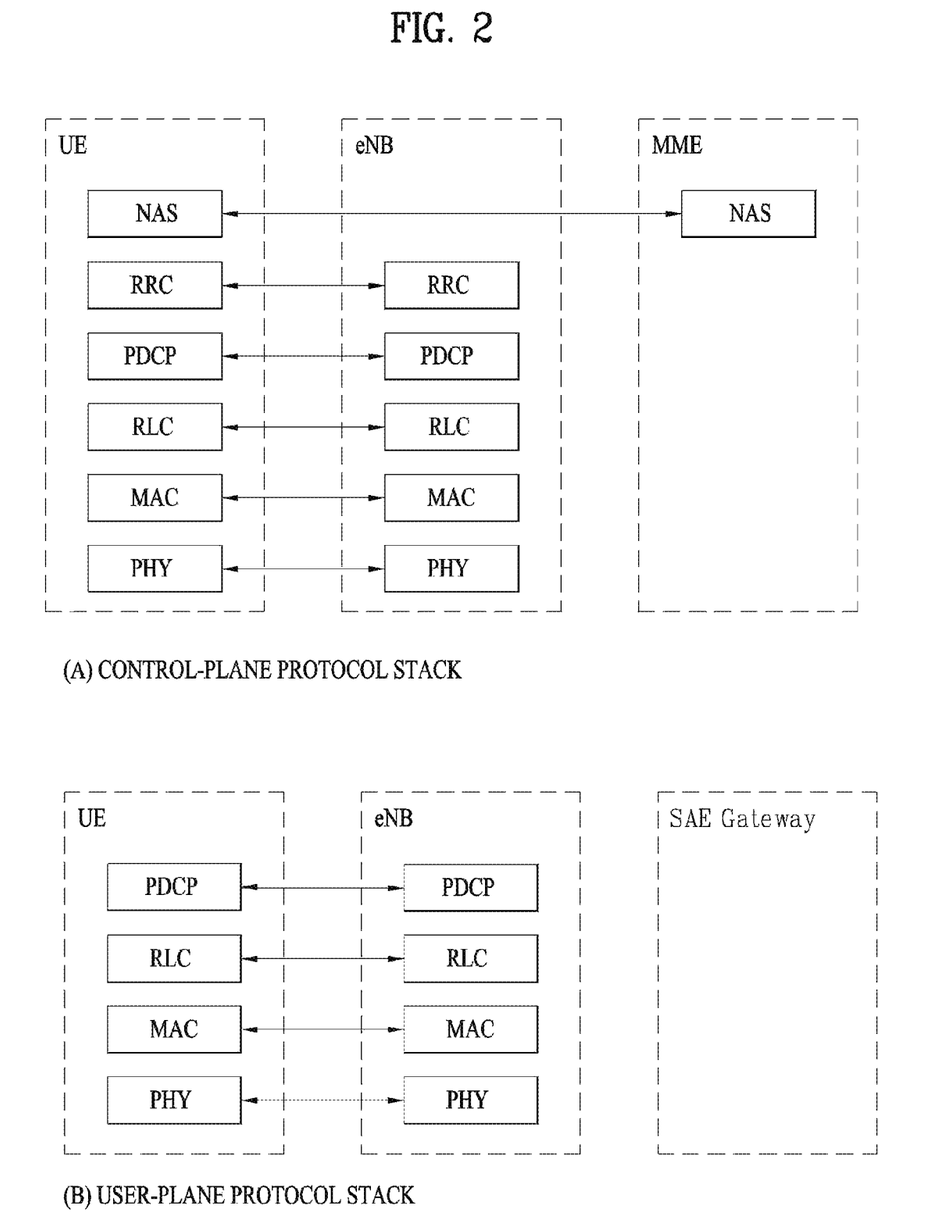
FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN).

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

One cell constituting an eNB is configured to use one of bandwidths of 1.25, 2.5, 5, 10, 15, and 20 MHz and provides a DL or UL transmission service to multiple UEs. Different cells may be configured to provide different bandwidths.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
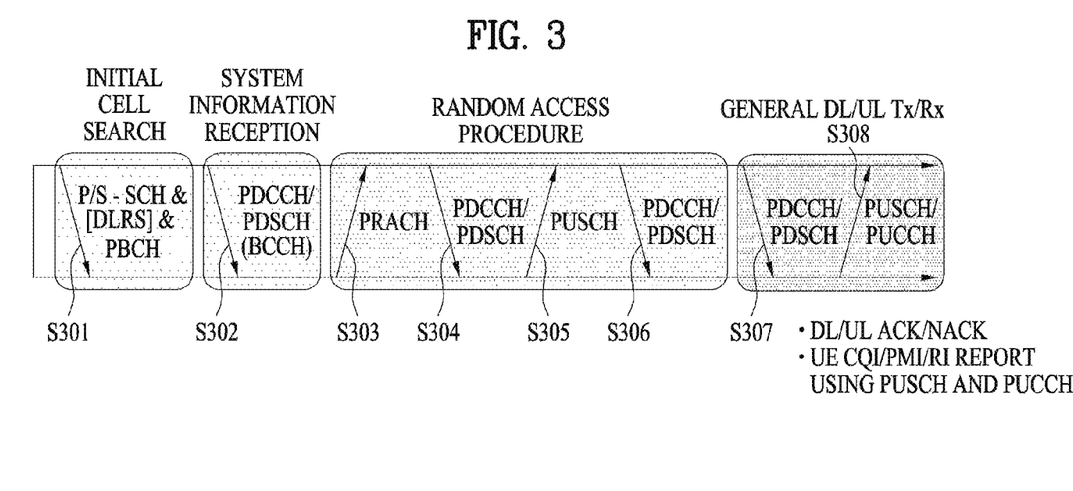
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
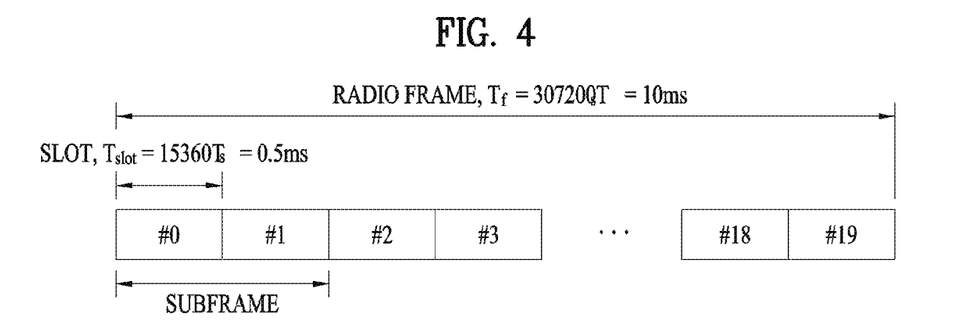
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s=1/(15 \text{ kHz} \times 2048)=3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
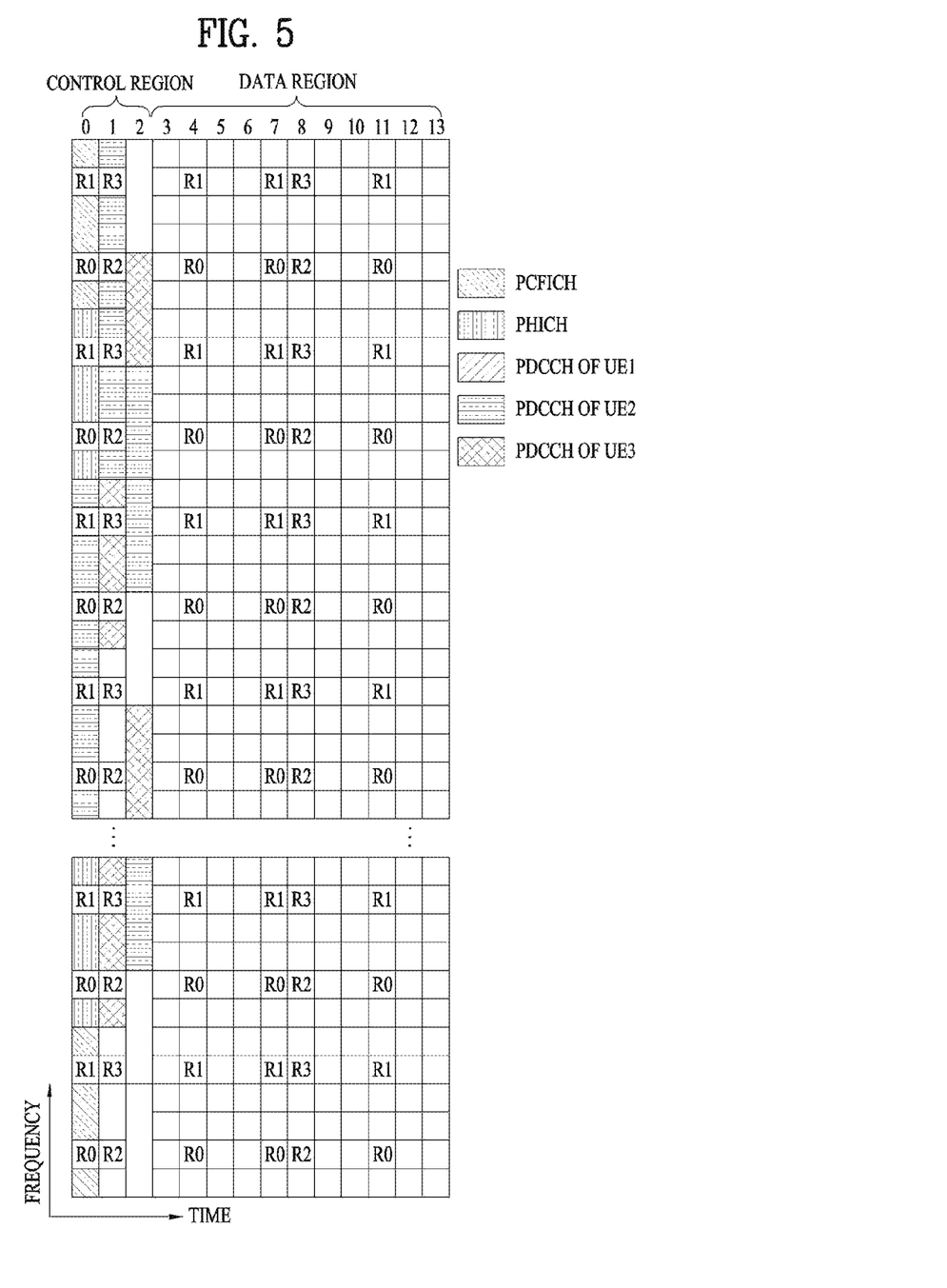
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Meanwhile, a basic resource unit of a downlink control channel is an REG (Resource Element Group). The REG is configured by 4 neighboring REs (Resource Elements) in a state that an RS is excluded. PCFICH and PHICH include 4 REGs and 3 REGs, respectively. PDCCH is configured in a unit of a CCE (Control Channel Element) and one CCE includes 9 REGs.

A UE is configured to check $M^{(L)} \geq (\geq L)$ number of CCEs, which are continuously allocated or allocated with a specific rule, to check whether or not PDCCH including L number of CCEs is transmitted to the UE. A value of the L to be considered by the UE to receive the PDCCH may correspond to a plural number. CCE sets checked by the UE to receive the PDCCH are defined as a search space. For example, LTE system defines the search space as follows.

TABLE 1

| Search space $S_k^{(L)}$ | | | Number of PDCCH candidates $M^{(L)}$ |
|---|---|---|---|
| Type | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In this case, a CCE aggregation level L denotes the number of CCEs that construct PDCCH, $S_k^{(L)}$ denotes a search space of a CCE aggregation level L, and $M^{(L)}$ corresponds to the number of PDCCH candidates to be monitored in the search space of the aggregation level L.

A search space can be classified into a UE-specific search space where access is allowed to a specific UE only and a common search space where access is allowed to all UE within a cell. A UE monitors common search spaces where a CCE aggregation level corresponds to 4 and 8 and monitors UE-specific search spaces where a CCE aggregation level corresponds to 1, 2, 4, and 8. A common search space can be overlapped with a UE-specific search space.

In addition, in a PDCCH search space assigned to a random UE in response to a CCE aggregation level, a position of the first CCE (having the lowest index) changes in every subframe depending on a UE. This is referred to as PDCCH search space hashing.

The CCEs can be distributed to a system band. More specifically, a plurality of logically continuous CCEs can be inputted into an interleaver and the interleaver performs a function of mixing a plurality of the inputted CCEs in a unit of REG Hence, frequency/time resources constructing one CCE are physically distributed to the entire frequency/time domain within a control region of a subframe. Consequently, although a control channel is configured in a unit of CCE, since interleaving is performed in a unit of REG, it is able to maximize a frequency diversity gain and an interference randomization gain.

Figure 6:
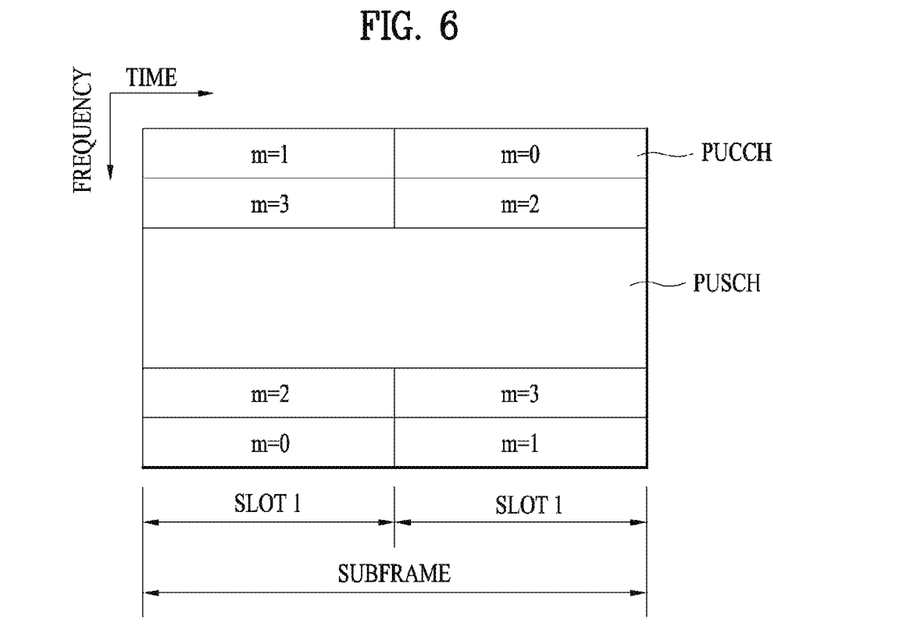
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

A next generation system considers introducing a low-cost/low-specification terminal mainly performing data communication such as reading a meter, measuring a water level, utilizing a surveillance camera, reporting inventory of a vending machine, etc. Although the terminal has low device complexity and low power consumption, the terminal seeks to provide an appropriate process rate to devices connected with the terminal. For clarity, the terminal is commonly referred to as an MTC (Machine Type Communication) UE or an IoT (Internet of Thing) UE.

It may consider a case that an MTC UE operates on a narrowband (e.g., 1.4 MHz, 180 kHz, or 200 kHz) only narrower than a system bandwidth in DL and UL. In this case, although it is able to lower complexity of the UE, it may set a limit on a maximum data rate or an average data rate. In particular, since a certain MTC/NB-IoT application field requires a higher maximum data rate or average data rate, it is necessary to have a method capable of achieving scalability.

In a next generation MTC system, a narrowband (hereinafter, NB) may correspond to an extended band compared to a band of a legacy 3GPP Release-13 MTC (e.g., the number of PRBs constructing a narrowband increases). When an MTC UE operating on a legacy NB including 6 PRBs and an MTC UE operating on an extended NB coexist, it is necessary to minimize a mutual impact between an operation on the extended NB and an operation on the legacy NB. In particular, when a size of an NB, which is used by a low-specification UE operating on a part of a system bandwidth only, is not fixed and there are various units, the present invention proposes a method of establishing an extended NB including a plurality of NB units and a method of allocating a resource when a data channel is transmitted on the extended NB.

In the following description, an NB corresponds to a bandwidth on which an MTC UE actually operates to perform transmission and reception. In the aspect of a serving cell, the NB may be equal to or narrower than a system bandwidth and can be configured by the N number of contiguous PRBs. The N may correspond to a plural number. For clarity, 6 PRBs corresponding to an NB size for a legacy MTC UE is defined as N1 and an extended NB size configured to increase the maximum data rate in a next generation system is defined as N2. In particular, an NB indicates a narrowband having a size of N1 and an extended NB indicates a narrowband having a size of N2. Specifically, an NB size for unicast PUSCH and an NB size for unicast PDSCH may have a plurality of sizes rather than a single size. However, the present invention is not restricted by a case that an NB of a single size is applied to a different channel (e.g., MPDCCH (MTC PDCCH), etc.).

<Method of Configuring Starting Point of Extended NB>

A starting point of an extended NB on which PDSCH/PUSCH is transmitted can be provided via DCI (Downlink Control Information) that schedules the PDSCH/PUSCH. More specifically, the starting point of the extended NB can be indicated by a resource allocation field of the DCI. In this case, it may consider representing the starting point of the extended NB by a term for an NB in consideration of the coexistence with a legacy MTC UE. As a simple method, the starting point of the extended NB can be represented by an NB index within a system bandwidth.

In order to obtain a high data rate, N2 corresponding to an extended NB size can be configured to be equal to or greater than N1 corresponding to a size of an NB. However, a specific PRB may not be defined as an extended NB depending on a system bandwidth. In the following, the specific PRB is referred to as a non-NB PRB. In this case, it is necessary to clearly determine whether to use the PRB as an extended NB. This is because, if a non-NB PRB is not included in an extended NB, a size of the extended NB is restricted according to a starting point configuration of the extended NB.

Specifically, when an extended NB deviates from a system bandwidth according to such an extended NB configuration as a starting point and a size of the extended NB, when the sum of a starting PRB index and a size (e.g., number of PRBs) of the extended NB is greater than a system bandwidth, and/or when an extended NB configuration includes a non-NB PRB, it is regarded as the non-NB PRB is not valid. In particular, an eNB and a UE do not expect a configuration that the extended NB configuration includes the non-NB PRB. For example, when a resource is actually allocated to PDSCH or PUSCH within an extended NB, if the resource allocation deviates from a system bandwidth and/or when an extended NB includes a non-NB PRB, it is regarded as the non-NB PRB is not valid. As a different method, it may perform rate matching or puncturing on the non-NB PRB rather than regard the non-NB PRB as invalid.

However, when resource allocation including a non-NB PRB is performed for PUSCH, the resource allocation can be comprehended as non-contiguous resource allocation except the non-NB PRB. As a further different method, when resource allocation including a non-NB PRB is indicated, it may use a resource including the non-NB PRB as it is for PUSCH.

More specifically, a center PRB may correspond to a non-NB PRB depending on a system bandwidth. In this case, a PUSCH bandwidth supported by a UE may vary depending on the system bandwidth. For example, when a non-NB PRB is located at the center of a system bandwidth, a PUSCH bandwidth corresponds to the maximum 25 PRBs. Otherwise, the PUSCH bandwidth may correspond to the maximum 24 PRBs. In this case, a field value can be configured on the basis of (1) the maximum bandwidth (i.e., 25 PRBs) all the time. In this case, resource allocation allocated to a PRB corresponding to the center of the system bandwidth, resource allocation allocated to a PRB corresponding to the first of the system bandwidth, or resource allocation allocated to a PRB corresponding to the last of the system bandwidth can be ignored.

(2) Or, a resource allocation field for PUSCH can be configured on the basis of a system bandwidth (i.e., 24 PRBs) except a non-NB PRB located at the center of a system bandwidth. In this case, when resource allocation is performed, it may refer to resource allocation information for PUSCH in the aspect of virtual PRBs (i.e., in the aspect of virtual PRBs including 24 PRBs) assuming that a non-NB PRB does not exist. When the resource allocation information includes a center PRB corresponding to a non-NB PRB in actual PRB, in other word, when the number of actual PRBs corresponds to 25, although the number of virtual PRBs corresponds to 24, it may use the center PRB for PUSCH. In particular, the virtual PRBs for PUSCH may not include the center PRB corresponding to an actual non-NB PRB in the aspect of a system bandwidth. The method above can also be applied to PDSCH. The method can be restricted to a case that a non-NB PRB is used for PDSCH.

In addition, whether to use a non-NB PRB (i.e., center PRB) as a resource for PDSCH and/or PUSCH can be configured via higher layer signaling. This is because contiguous resource allocation is important for the PUSCH due to single carrier property or PAPR.

The present method can also be applied to an extended NB determined by frequency hopping. In this case, following specific examples can be applied to the extended NB determined by frequency hopping.

When an extended NB determined by hopping deviates from a system bandwidth and/or includes a non-NB PRB, it may regard a band deviated from the system bandwidth and the non-NB PRB as invalid.

When an extended NB determined by hopping deviates from a system bandwidth and/or includes a non-NB PRB, if a hopping flag is enabled, it may regard a band deviated from the system bandwidth and the non-NB PRB as invalid. Or, in this case, it may not perform hopping irrespective of the hopping flag.

When an extended NB determined by hopping deviates from a system bandwidth and/or includes a non-NB PRB, if a hopping flag is enabled and a resource is actually allocated to a band deviated from the system bandwidth and the non-NB PRB, it may regard the band deviated from the system bandwidth and the non-NB PRB as invalid.

Meanwhile, as a different method, it may perform rate matching or puncturing on the band deviated from the system bandwidth and the non-NB PRB rather than regard the band deviated from the system bandwidth and the non-NB PRB as invalid. Or, it may not perform hopping all the time irrespective of a hopping flag value. More specifically, when resource allocation including a non-NB PRB is indicated, it may use a resource including the non-NB PRB as it is for PUSCH. In particular, it may regard the non-NB PRB as a valid resource, This is because contiguous resource allocation is important in PUSCH.

It may consider changing an NB offset value for hopping or differently comprehending the NB offset value rather than regarding the band deviated from the system bandwidth and the non-NB PRB as invalid. Specifically, in order to prevent a case of deviating from a system bandwidth and/or a case of including a non-NB PRB, it may control an offset value to be configured by 1 or −1. Moreover, a value itself capable of being configured as an offset can be differently configured depending on a system bandwidth. More specifically, it may consider a case of using a non-NB PRB by including the non-NB PRB in an extended NB. In this case, it may be able to determine whether or not the non-NB PRB is regarded as valid based on whether or not the non-NB PRB deviates from a system bandwidth.

An MTC UE operating on a legacy NB can perform hopping as well. In order to avoid a collision between the MTC UE operating on the legacy NB and a UE operating on an extended NB, information on NB hopping (e.g., offset value) can be independently configured. Specifically, when there are a plurality of sizes of an extended NB, NB hopping information (e.g., offset) can be independently configured according to each of the sizes or a size group.

It is preferable to indicate a starting position of an extended NB by DCI (for PUSCH/PDSCH at least). However, if it is able to select all PRB indexes within a system bandwidth, although it is advantageous in terms of flexibility, excessive signaling overhead may occur. Hence, the starting position of the extended NB can be represented by a term (e.g., NB index) for an NB (configured by 6 PRBs). When all NB indexes are configurable as a starting position, a non-NB PRB can be included in the extended NB. If the non-NB PRB is not used, NB indexes capable of being configured as the starting position can be reduced by reflecting the non-NB PRB which is not used. More specific examples are described in the following.

Example 1) In order to set a limit on a starting position of an extended NB or an NB index capable of being configured as a starting position, an NB index capable of being configured as a starting position of an extended NB can be restricted to a specific index set. For example, an index set configured by even-numbered indexes can be configured as an NB index capable of being configured as a starting position of an extended NB.

When the number of PRBs constructing a system bandwidth corresponds to an odd number, a PRB including DC or a PRB corresponding to a center of the system bandwidth does not belong to any NB. In particular, when the number of NBs corresponds to an even number, a starting position is restricted by an even-numbered index or a subset for the even-numbered index to prevent a situation that a non-NB PRB is included in an extended NB. When the number of NBs included in a system bandwidth corresponds to an odd number, if an NB index is less than a value resulted from dividing the entire NBs by 2, a starting position of an extended NB is restricted by an even-numbered index or a subset for the even-numbered index. Otherwise, the starting position of the extended NB is restricted by an odd-numbered index or a subset for the odd-numbered index. More specifically, when the number of PRBs constructing a system bandwidth corresponds to an even number, it may not set a limit on an NB index capable of being configured as a starting position.

Example 2) since an important channel such as PSS/SSS/PBCH is transmitted on 72 subcarriers positioned at the center of a system bandwidth, PDSCH transmission can be partly limited on an NB overlapped with the corresponding region. In order to set a limit on a starting position of an extended NB or an NB index capable of being configured as a starting position, the NB index capable of being configured as the starting position can be restricted to NB indexes positioned at both ends of the system bandwidth (e.g., 0 and N_NB−1, where N_NB corresponds to the number of NBs belonging to the system bandwidth). In this case, size extension extended from a start NB index may have a form of extending to the center of the system bandwidth.

More specifically, an NB index capable of being configured as a starting position of an extended NB can be differently configured in uplink. In this case, in order to avoid NB indexes corresponding to both ends where PUCCH is transmitted in general, the NB index capable of being configured as the starting position can be restricted to an NB index adjacent to the center of the system bandwidth (e.g., a smallest value among integers greater than N_NB/2 or a greatest value among integers smaller than N_NB/2).

And, the extended NB starts at a position near the center of the system bandwidth and a size of the extended NB can be extended towards an end of the system bandwidth.

Meanwhile, an extended NB can be defined irrespective of an NB. In particular, the extended NB can be independently defined instead of being determined based on a legacy NB index. Specifically, it may be able to configure a boundary between the NB and the extended NB to be aligned. In this case, the present invention can be expanded/applied to the case above.

<Method of Configuring Size of Extended NB>

It may consider a method of configuring a size of PRBs constructing an extended NB in a unit of NB. The method is advantageous in terms of resource management in consideration of coexistence with a UE operating on a legacy NB. The method is also advantageous in terms of signaling overhead because an amount of information necessary for representing a size of an extended NB is reduced. However, in case of considering a non-NB PRB, the size of the extended NB may vary based on whether or not the non-NB PRB is included according to an extended NB configuration. In this case, when a UE is implemented, it is necessary to consider a bandwidth in consideration of a case of including the non-NB PRB.

It may consider a different method. A size of PRBs constructing an extended NB can be configured in a unit of PRB. In this case, it may have a room capable of maximizing flexibility in terms of managing/utilizing a resource according to granularity. However, signaling overhead can be relatively big and resource management can be complex in consideration of the coexistence between UEs operating on a legacy NB.

In a next generation system, an MTC UE can be configured in a high data rate mode or an extended NB mode to operate with a high data rate. A data rate or and a size of an extended NB capable of being supported may vary according to a UE. A UE may inform an eNB of whether or not a high data rate/extended NB is supported in a form of a UE capability report. More specifically, the UE reports information on a level of a data rate supported by the UE or a size of an extended NB to be extended to the eNB.

When an extended NB is configured, a size of the extended NB can be configured via higher layer signaling. Specifically, when an eNB sets a high data rate mode to a UE, it can be comprehended as the eNB sets a size of an extended NB. In this case, since the size of the extended NB is configured via higher layer signaling, it is suitable for a case that a change frequency of the size of the extended NB is low. A DCI size (e.g., a field size for resource allocation) can be changed according to a signaled size.

As a further different method, it may consider a method of configuring a size of an extended NB by DCI as a method of flexibly configuring the size of the extended NB. Specifically, the size of the extended NB can be defined in a resource allocation field. Basically, it is necessary to avoid occurrence of ambiguity for a DCI size between a UE and an eNB. Hence, although the size of the extended NB changes, it is preferable not to change the DCI size. In particular, a DCI size (for PUSCH/PDSCH) can be identically maintained between high data rate modes.

More specifically, a plurality of high data rate modes may exist (high/extremely high). In this case, a DCI size (for PUSCH/PDSCH) can be fixed for each of a plurality of the high data rate modes. A size of a single extended NB or a size of a plurality of extended NBs can be configured within the high data rate mode.

<Method of Allocating Resource of PDSCH/PUSCH in Extended NB>

Basically, a size of an extended NB is configured to be bigger than a size of a legacy NB to utilize a bandwidth as much as an extended size for scheduling. In particular, when N2 corresponding to the size of the extended NB is configured to be bigger than N1 corresponding to the size of the legacy NB, it may assume that resource allocation is performed using PRBs equal to or greater than N1 PRBs. However, when the size of the extended NB is determined by a higher layer, it is necessary to consider a case that resource allocation is performed using PRBs less than the N1 PRBs.

An extended NB can be configured by continuous/discontinuous PRBs or an NB depending on a configuration. When an extended NB is configured by discontinuous PRBs, the extended NB is useful when the extended NB and MPDCCH (MTC physical downlink control channel) are 1-DMed to transmit PDSCH. When resource allocation is performed within the extended NB configured by discontinuous PRBs, a resource is firstly allocated in a form of a virtual RB (VRB) and then the resource is mapped to discontinuous PRBs/NBs.

A method of allocating a resource to PDSCH/PUSCH within an extended NB can be basically interlocked with a PRB size for the extended NB. For example, when a size of the extended NB is configured by N_RB^ENB, a field size for resource allocation within the extended NB may correspond to ceil(log 2(N_RB^ENB*(N_RB^ENB+1)/2)). This method may correspond to a method of performing resource allocation based on a starting PRB and an RIV (Resource Indication Value) which is determined based on a PRB size when continuous allocation is performed. According to the method above, a DCI size is basically bigger than a DCI size of an MTC UE operating on a legacy NB. As a size of the extended NB is getting bigger, the DCI size can increase as well.

As a different method, although the size of the extended NB increases, it may consider a method of configuring DCI to be identical to DCI of an MTC UE operating on a legacy NB. Or, it may consider a method of configuring a DCI size to be identically maintained during a predetermined section according to a section of the size of the extended NB. This is intended to obtain a merit in terms of DCI overhead. Basically, it may consider that a resource allocation frequency is less for a UE to which an extended NB is set.

For example, when resource allocation is performed according to a size of an extended NB (or section), it may consider a method of differently configuring a basic PRB scheduling unit. More specifically, as the size of the extended NB is getting bigger, it may change a step size to make scheduling to be performed in a unit of a plurality of PRBs rather than a unit of 1 PRB. In addition, it may reduce a field size for resource allocation to make a small value of RIV not to be used. For example, it may be able to exclude a single LSB or a plurality of LSBs (least significant bits) for RIV to make the single LSB or a plurality of the LSBs not to be used.

In order to avoid ambiguity for a DCI size, a field size can be conservatively configured. In this case, a field size for the entire resource allocation can be excessively increased. In particular, resource allocation for PUSCH/PDSCH can be configured on the basis of a system bandwidth for a UE operating in a high data rate mode. Specifically, when a resource is allocated, a resource allocation scheme may have a form of RIV which is configured based on a starting PRB and a size of contiguous PRBs. In this case, the resource allocation scheme can be performed only when a size of an extended NB is indicated via DCI.

<Fallback Operation for Extended NB>

In a next generation system, an extended NB mode (or wider bandwidth mode) can be configured by an eNB. In this case, a size of an NB, which is used/assumed at the time of transmitting PDSCH and/or PUSCH, can be extended more. DCI for scheduling the PDSCH and/or the PUSCH may have an information size different from an information size of DCI at the time of operating as a general NB. An interpretation method/field configuration may be different between the DCIs.

When a UE operates in a general NB mode, the UE can switch to an extended NB mode via higher layer signaling. In this case, an ambiguity section according to NB assumption may occur between the UE and an eNB during a reconfiguration section for switching to the extended NB mode from the general NB mode or reconfiguration section for switching to the general NB mode from the extended NB mode. In addition, when the UE operates in the extended NB mode, it may consider changing information (e.g., NB size) on the extended NB. In this case, it is necessary to consider a fallback operation for the reconfiguration section.

When the extended NB mode (or wider bandwidth operation) is set to the UE, it may consider a method of making the UE operate in the general NB mode for specific DCI (e.g., the UE operates on an NB configured by 6 PRBs or the UE operates irrespective of an extended NB mode configuration). Specifically, when DCI is detected in a CSS (Common Search Space), a DCI field is configured on the basis of a general NB. And, when PUSCH and/or PDSCH are scheduled by the DCI, scheduling is performed using the general NB (e.g., maximum 6 PRBs) instead of operating with an extended NB. Specifically, when scrambling and/or CRC masking for DCI detected in Type0-CSS corresponds to C-RNTI, the UE may operate on the general NB. In particular, when the UE operates in the extended NB mode, DCI is configured on the basis of the extended NB. When PDSCH and/or PUSCH scheduled by the DCI operate on the basis of the extended NB, the DCI can be detected from a USS.

As a different method, when the UE operates in the extended NB mode, it may correspond to a case that additional RNTI is used. The additional RNTI can be configured via higher layer signaling when the extended NB mode is configured. The UE can determine an operation mode from among the extended NB mode and the normal NB mode via RNTI distinction.

The aforementioned methods can be extensively applied to an operation and a mode for supporting a high data rate. For example, it may be able to configure scheduling DCI to be detected from a USS only for a mode of increasing maximum TBS, a mode of supporting HARQ-ACK bundling, a mode of increasing the maximum HARQ process number, and the like. If the scheduling DCI is detected from a CSS, although a corresponding mode is configured via higher layer signaling, the mode is not applied.

It is able to support a fallback operation via the aforementioned scheme or an extension of the scheme in a system using a scheme such as NB-IoT or a third communication system using IoT scheme. Specifically, NB-IoT can support a high data rate using a method of supporting a larger maximum TBS, a method of decreasing or increasing a time resource and/or a frequency resource for an RU (Resource Unit), and/or a method of changing an NB size.

In this case, whether to use an operation between a fallback operation and a high data rate operation can be differently configured according to CRC masking performed on DCI that schedules NPDSCH/NPUSCH. For example, when CRC masking is performed for the purpose of the high data rate operation, the CRC masking can be implemented with a scheme of using third RNTI. And, whether to use an operation between a fallback operation and a high data rate operation can be determined based on a CSS and a USS. For example, when a high data rate operation is configured via higher layer, if DCI is detected from a CSS, a scheduled NPDSCH (Narrowband PDSCH)/NPUSCH (Narrowband PUSCH) corresponds to a fallback operation. If the DCI is detected from a USS, a scheduled NPDSCH/NPUSCH corresponds to a high data rate operation. More specifically, the CSS may correspond to a space for scheduling random access procedure-related channels (e.g., RAR, DCI for scheduling retransmission of Msg3, DCI for scheduling retransmission of Msg4) (i.e., Type2-NPDCCH CSS).

As a further different method, it is able to distinguish a fallback operation from a high data rate operation by a combination of specific field values of DCI transmitted on NPDCCH.

All or a part of DCI formats used in a CSS and a USS may have the same format. When a size of a DCI format is the same and a start position of a DCI candidate is the same, it is difficult for a UE to recognize a search space to which the DCI belongs among the CSS and the USS. In this case, candidates for CSS DCI and candidates for USS DCI may have the same aggregation level and a different aggregation level.

In case of using the CSS DCI to support a fallback operation, it is difficult for a UE to determine an NB on which the UE operates among an extended NB and a general NB. In order to solve the ambiguity problem, when the UE operates in an extended NB mode, if a starting position of a candidate for the CSS DCI and a starting position of a candidate for the USS DCI are the same and a DCI size is the same, the UE can always comprehend the candidates as the CSS. An eNB can transmit the CSS DCI using the candidates.

As a further different method, the UE may comprehend the candidates as the USS and operate on an extended NB. Whether the candidates are assumed as the CSS or the USS can be configured via higher layer signaling.

According to the present invention, when a UE operating on an NB and an MTC UE operating in a unit of extended NB coexist, it is able to more flexibly set/change a data rate/resource in use to the MTC UE or a cell.

Figure 7:
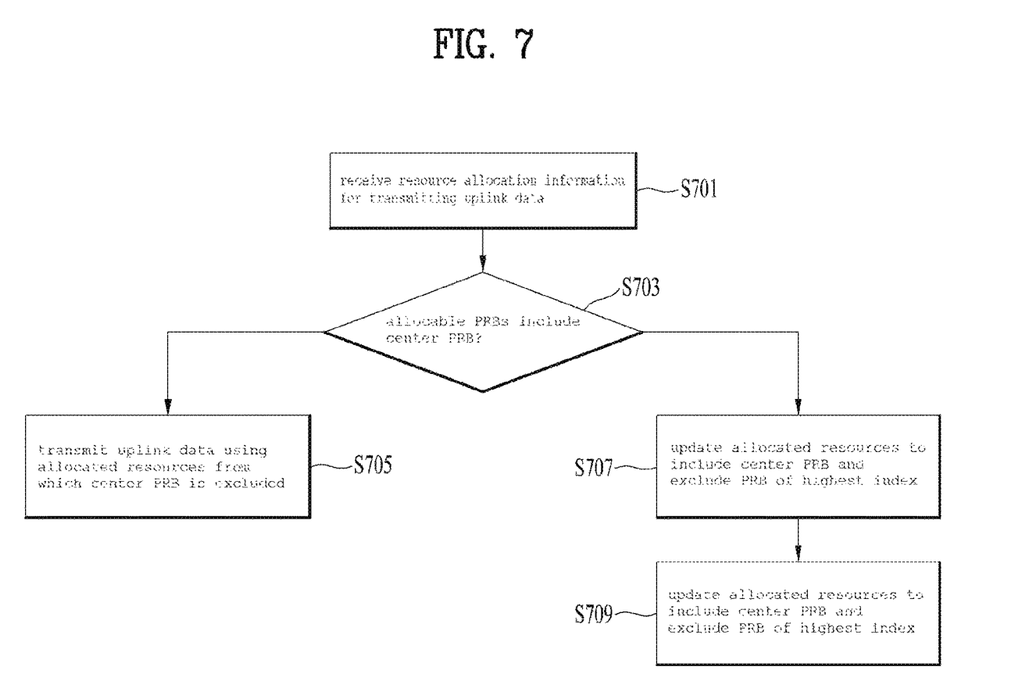
FIG. 7 illustrates an example of establishing and utilizing an extended narrowband according to an embodiment of the present invention.

FIG. 7 illustrates an example of establishing and utilizing an extended narrowband according to an embodiment of the present invention.

Referring to FIG. 7, a UE receives a downlink control signal for performing extended NB communication from a base station [S701]. In particular, the downlink control signal includes resource allocation information about resource blocks contiguously allocated for the uplink data signal among allocable resource blocks except a center resource block of a system bandwidth. In this case, it is preferable for a size of the resource allocation information to have a fixed value irrespective of whether or not the allocable resource blocks include the center resource block. In addition, the resource allocation information can include information on a starting index of the contiguously allocated resource blocks and information on the number of the contiguously allocated resource blocks.

Subsequently, the UE determines whether or not the allocable resource blocks include the center resource block of the system bandwidth [S703]. If the allocable resource blocks do not include the center resource block of the system bandwidth, as illustrated in the step S705, the UE transmits the uplink data signal using resources indicated by the resource allocation information as it is.

On the contrary, in the step S703, if it is determined that the allocable resource blocks include the center resource block of the system bandwidth, the UE updates the contiguously allocated resource blocks indicated by the resource allocation information to make the contiguously allocated resource blocks include the center resource block and updates the contiguously allocated resource blocks to make a resource block of the last index to be excluded from the contiguously allocated resource blocks [S707].

Figure 8:
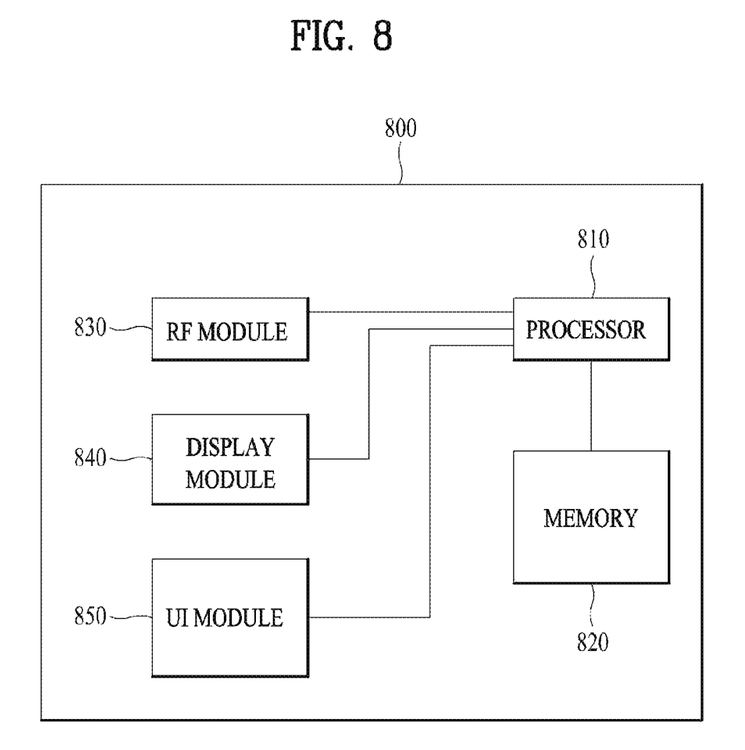
FIG. 8 is a diagram showing configurations of a base station and a user equipment applicable to an embodiment of the present invention.

FIG. 8 is a block diagram of a communication apparatus according to an embodiment of the present disclosure.

Referring to FIG. 8, a communication device 800 includes a processor 810, a memory 820, a radio frequency (RF) module 830, a display module 840, and a user interface (UI) module 850.

The communication device 800 is illustrated for convenience of description and some modules may be omitted. The communication device 800 may further include necessary modules. Some modules of the communication device 800 may be further divided into sub-modules. The processor 800 is configured to perform operations according to the embodiments of the present disclosure exemplarily described with reference to the drawings. Specifically, for a detailed description of operations of the processor 800, reference may be made to the description described with reference to FIGS. 1 to 7.

The memory 820 is connected to the processor 810 and stores operating systems, applications, program code, data, and the like. The RF module 830 is connected to the processor 810 and performs a function of converting a baseband signal into a radio signal or converting a radio signal into a baseband signal. For this, the RF module 830 performs analog conversion, amplification, filtering, and frequency upconversion or performs inverse processes thereof. The display module 840 is connected to the processor 810 and displays various types of information. The display module 840 may include, but is not limited to, a well-known element such as a liquid crystal display (LCD), a light emitting diode (LED), or an organic light emitting diode (OLED). The UI module 850 is connected to the processor 810 and may include a combination of well-known UIs such as a keypad and a touchscreen.

The above-described embodiments are combinations of elements and features of the present disclosure in a predetermined manner. Each of the elements or features may be considered selective unless mentioned otherwise. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. In the appended claims, claims that are not explicitly dependent upon each other may of course be combined to provide an embodiment or new claims can be added through amendment after the application is filed.

In this document, a specific operation described as performed by an eNB may be performed by an upper node of the eNB. Namely, it is apparent that, in a network comprised of a plurality of network nodes including an eNB, various operations performed for communication with a UE may be performed by the eNB, or network nodes other than the eNB. The term eNB may be replaced with the terms fixed station, Node B, eNode B (eNB), access point, etc.

The embodiments according to the present disclosure can be implemented by various means, for example, hardware, firmware, software, or combinations thereof. In the case of a hardware configuration, the embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of a firmware or software configuration, the method according to the embodiments of the present disclosure may be implemented by a module, a procedure, or a function, which performs functions or operations described above. For example, software code may be stored in a memory unit and then may be executed by a processor. The memory unit may be located inside or outside the processor to transmit and receive data to and from the processor through various well-known means.

The descriptions of the presented embodiments are provided so that one of ordinary skill in the art of the present disclosure may use or implement the present disclosure. Various modifications to these embodiments will be readily apparent to those skilled in the art of the present disclosure. The generic principles defined herein may be applied to other embodiments without departing from the scope of the present disclosure. Thus, the present disclosure is not to be limited to the embodiments set forth herein but is to be accorded the widest scope consistent with the principles and novel features presented herein.

INDUSTRIAL APPLICABILITY

Although a method of configuring an extended narrowband in a narrowband wireless communication system and an apparatus therefor are described with reference to examples applied to 3GPP LTE system, it may be applicable to various kinds of wireless communication systems as well as the 3GPP LTE system.

What is claimed is:

1. A method of transmitting an uplink data signal by a user equipment (UE) in a narrowband wireless communication system, the method comprising:
receiving, from a base station, a downlink control signal including resource allocation information about virtual physical resource blocks (PRBs) contiguously allocated for the uplink data signal among allocable virtual PRBs; and
transmitting the uplink data signal to the base station based on the contiguously allocated PRBs indicated by the resource allocation information,
wherein the allocable virtual PRBs are virtually contiguous PRBs excluding a center PRB from a system bandwidth,
wherein based on allocated virtual PRBs including PRBs on both sides of the center PRB, the uplink data signal is transmitted using the contiguously allocated PRBs including the center PRB, and
wherein a number of the contiguously allocated PRBs is a fixed value regardless of the center PRB.

2. The method of claim 1, wherein when the allocated virtual PRBs include PRBs on both sides of the center PRB, the contiguously allocated PRBs are updated to exclude a PRB the last index.

3. The method of claim 1, wherein the resource allocation information includes a starting index of the contiguously allocated PRBs and information on the number of the contiguously allocated PRBs.

4. A user equipment in a narrowband wireless communication system, comprising:
a transceiver; and
a processor configured to receive, from a base station, a downlink control signal including resource allocation information about virtual physical resource blocks (PRBs) contiguously allocated for an uplink data signal among allocable virtual PRBs in a manner of being connected with the transceiver, the processor configured to transmit the uplink data signal to the base station based on the contiguously allocated PRBs indicated by the resource allocation information,
wherein the allocable virtual PRBs are virtually contiguous PRBs excluding a center PRB from a system bandwidth,
wherein based on the allocated virtual PRBs including PRBs on both sides of the center PRB, the uplink data signal is transmitted using the contiguously allocated PRBs including the center PRB, and
wherein a number of the contiguously allocated PRBs is a fixed value regardless of whether or not the center resource block is included in the allocable PRBs.

5. The user equipment of claim 4, wherein when the allocated virtual PRBs include PRBs on both sides of the center PRB, the processor is configured to update the contiguously allocated PRBs to exclude a PRB of the last index.

6. The user equipment of claim 4, wherein the resource allocation information includes a starting index of the contiguously allocated PRBs and information on the number of the contiguously allocated PRBs.

* * * * *